United States Patent [19]

Weber

[11] 4,007,016

[45] Feb. 8, 1977

[54] CONTINUOUS-FLOW REACTOR FOR HIGH VISCOSITY MATERIALS

[75] Inventor: Arthur P. Weber, New York, N.Y.

[73] Assignee: The Bethlehem Corporation, Bethlehem, Pa.

[22] Filed: Mar. 6, 1975

[21] Appl. No.: 555,807

[52] U.S. Cl. .................................. 23/285; 23/290; 259/8; 259/97; 259/102

[51] Int. Cl.[2] ...................... B01F 7/16; B01F 7/24; B01J 3/04

[58] Field of Search .................. 23/252 R, 283, 285, 23/290; 259/6, 7, 8, 9, 10, 24, 26, 41, 44, 97, 102; 165/108; 260/95 R, 95 C

[56] References Cited

UNITED STATES PATENTS

| | | | |
|---|---|---|---|
| 612,181 | 10/1848 | Spurrier | 259/97 |
| 2,939,770 | 6/1960 | Schwartzkopff et al. | 23/283 |
| 3,363,994 | 1/1968 | Brooks et al. | 23/283 X |
| 3,567,402 | 3/1971 | Christensen | 23/285 |
| 3,737,288 | 6/1973 | Hochman | 23/285 |
| 3,752,653 | 8/1973 | Weber | 23/283 |
| 3,759,669 | 9/1973 | Aaron et al. | 23/283 X |
| 3,877,881 | 4/1975 | Ono et al. | 23/285 |

FOREIGN PATENTS OR APPLICATIONS

| | | | |
|---|---|---|---|
| 1,932,898 | 2/1970 | Germany | 23/285 |
| 86,248 | 4/1896 | Germany | 259/97 |
| 391,800 | 5/1933 | United Kingdom | 23/285 |
| 321,042 | 11/1972 | U.S.S.R. | 259/97 |

*Primary Examiner*—Joseph Scovronek
*Assistant Examiner*—Michael S. Marcus
*Attorney, Agent, or Firm*—Dorfman, Herrell and Skillman

[57] ABSTRACT

A reactor of one or more stages for the continuous processing of high viscosity materials wherein each stage is provided with a stage barrier for directing and controlling the flow of process materials within each stage of the reactor and for controlling the egress of material from each stage of the reactor. A rotor shaft is rotatably mounted at opposite end walls of the reactor and extends through the reactor coaxially with its longitudinal axis. Fixably attached to the rotor shaft for rotation within each stage is a mixing assembly including a cylindrical draft tube positioned coaxially with respect to the reactor side wall, a helical screw mounted within the draft tube, and a ribbon agitator mounted within the annular space between the draft tube and reactor wall and having a pitch opposite to that of the helical screw. The agitator and the helical screw have preselected relative pitches and dimensions so that, when rotated, they cooperate with the stage barrier, the vessel wall and the draft tube to recirculate a predetermined portion of process material in a fixed flow pattern within each stage while advancing a remaining predetermined portion of the process material out of the stage in one direction.

4 Claims, 5 Drawing Figures

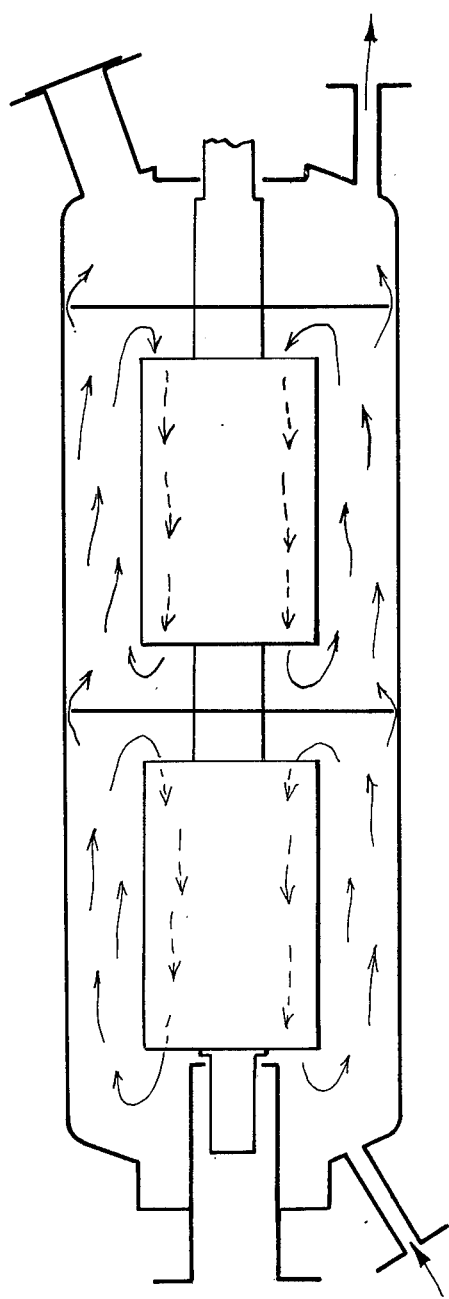
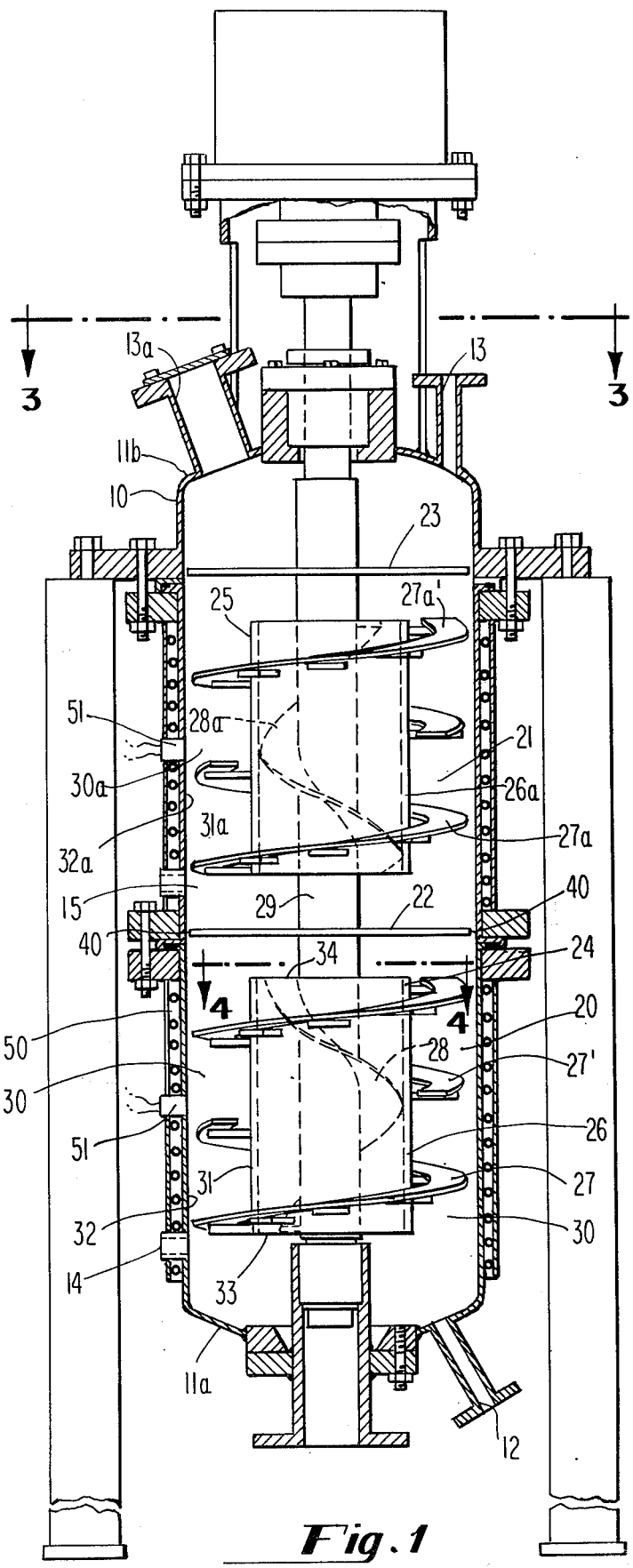
Fig. 2
Fig. 1

CONTINUOUS-FLOW REACTOR FOR HIGH VISCOSITY MATERIALS

The present invention relates to an apparatus for continuously mixing and reacting materials, and more particularly, it relates to a mixing reactor which provides an efficient means for controlling the reaction variables and mixing characteristics while homogeneously and continuously processing high viscosity materials. The invention further provides a method by which the process materials are restricted to a well defined flow path within each stage of the reactor thereby assuring homogenous treatment of the materials.

BACKGROUND OF THE INVENTION

The present invention is based on the consideration that the main factors in effecting the development of a chemical reaction are:

a. The manner and intensity by which the reactants come into contact with one another;

b. The degree of agitation and thus dispersion of the reactants coming into mutual contact;

c. The shape of the space in which the reaction occurs;

d. The temperature and pressure under which the reaction or reactions take place;

e. The uniform treatment of the materials to be processed.

The apparatus according to this invention is capable of efficiently controlling all of these factors while continuously processing the reacting materials.

At present, there is a growing trend toward the use of continuous-flow chemical reactors as replacements for batch-type reactors employed heretofore. The continuous-flow reactors are readily adapted to be used in conjunction with on-stream chemical composition analyzers and other on-line monitoring equipment which continuously control the processing as it takes place, thereby achieving greater efficiency and cost savings in the production of various chemical products. For example, such reactors find particular applicability in the polymerization of resins and in other chemical reactions where the process requires that reactants have predictable residence times, in order to monitor the completeness of the reaction. Residence time, i.e., the amount of time spent by an identifiable group of reactants in a defined location within a reactor, is an extremely important factor in maximizing the output and minimizing time and costs. This is generally true in any chemical syntheses where significant residence time is required in order to satisfy reaction kinetics. Generally, organic reactions, and especially polymerizations, require significant residence times during mechanical processing. This is especially true in large scale, continuous operations. Being able to accurately predict and control residence time has been considered a primary goal in the continuous processing of chemical reactants, especially viscous reactants such as those encountered in polymerization reactions.

Also, the success of commercial chemical reactions, such as polymerization, is measured by the properties, and more specifically, the uniformity of properties, exhibited by the resulting product and by the quantity of product or yield produced from a given amount of starting materials. In many cases, in order to achieve such uniform properties, one must be able to control the temperature to which the process materials are subjected and the homogeneous manner in which they are mixed. These two factors, mixing and temperature control, are interrelated in the processing of viscous materials. Such materials, because of their low thermal conductivity, are normally very poor heat transfer media. However, it is possible to improve the heat transfer in such materials by effecting continuous agitation thereby keeping the body of the reaction mixture continuously in motion and well intermixed. This becomes more difficult in viscous masses such as those formed by high polymers. Ideally, in designing an apparatus to process such materials, one should provide a system which is capable of efficient heat transfer while effecting a homogeneous intermixture of reactants with a minimum of energy expenditure. All three factors should be provided for; otherwise the process will become uneconomic or the products will not possess the uniform properties required of commercial materials. A continuous flow reactor would be an ideal way to processss viscous materials; however, presently available reactors are not readily adapted to this use.

Typical continuous-flow reactors are described in an article by Arthur P. Weber entitled "The Design of Commercial Continuous Reactor Systems" in the January 1953 issue of *Chemical Engineering Progress* magazine and in U.S. Pat. No. 3,752,653. One type of continuous-flow reactor described by this patent is a closed-vessel having an inlet for the introduction of process materials at one end of the reactor, one or more central draft tubes having a series of inlet apertures at one end and an exhaust outlet at its other end, and an outlet for the discharge of processed materials at the end opposite to the inlet. Process material is flowed through the draft tube by means of impeller blades spaced apart axially within the cylindrical passage formed by the draft tube. The blades recirculate the process material within the vessel and through the draft tube while the material is being reacted. The presence of the draft tube in the vessel makes possible a computation of the residence time of the material in the vessel, and hence, enables one to control and measure the completeness of reaction. Although this reactor operates satisfactorily on low to moderate viscosity materials, a continuous-flow reactor which has an improved agitating and control capabilities adapted to the processing higher viscosity materials is highly desirable. A typical high viscosity material, as contemplated herein, would have a viscosity of about 100,000 centipoises or above. The above-described system is not effective to process materials which are highly viscous as they are introduced into the reactor or materials which become highly viscous during the course of processing. Obviously, this is a serious limitation in commercially important processes such as polymerizations, which in many cases involve highly viscous reactants or products.

Another type of reactor which can process high viscosity materials is the extruder-type, such as described in U.S. Pat. No. 3,765,481. Although reactors of this type are able to provide efficient mixing and transfer, such apparatus cannot provide a means for accurately controlling the residence time, and hence, the homogeneous treatment of the material being processed.

The present system can be used either alone or in conjunction with other systems to overcome the disabilities found in conventional systems, such as the ones described above, and at the same time provide the advantages of being able to continuously and accurately control critical processing variables such as feed rate, temperature, rate of shear, residence time, etc., for optimum processing.

Another reactor adapted for polymerization reactions is described in U.S. Pat. No. 3,567,402. This patent describes an adiabatic batch polymerization reactor having a vertical jacketed tube axially positioned within the reactor for the purpose of controlling the temperature in a restricted reaction zone. This arrangement is satisfactory for single batch polymerization reactions; however, unlike the present invention, this arrangement is not suitable for continuous processing. Nor is this type of reactor adapted to the non-adiabatic processes. Because of this and other limitations inherent in its design, this reactor is restricted in the variety of materials and types of reactions that it can process effectively. An additional advantage which the reactor of the present invention has over this type of reactor is that, because of its unique configuration and design, it does not require a control valve to control the flow of materials within a jacketed tube nor does it require temperature sensing means in the tube in order to monitor and control the reaction process.

With this in mind, it is the object of the present invention to overcome the foregoing disadvantages and to provide an improved continuous-flow reactor of one or more stages for processing high viscosity materials.

It is another object of the present invention to provide an apparatus for carrying out physical or mechanical mixing and chemical reactions more efficiently and to provide a simple and accurate method for predicting and controlling the continuous mixing and advancement of process materials, thus enabling one to determine accurate residence times for the materials and more carefully control mixing and reaction conditions.

As a further object, the present invention provides a continuous flow reactor having means for uniformly applying the high mechanical and shear forces necessary to process viscous materials flowing through the reactor, thereby improving the reactor performance and quality of the product.

It is another object of this invention to provide a well defined flow path for process material resident in each stage of the reactor thereby assuring the homogeneous treatment of material while advancing a selected portion of the material at a uniform controllable rate.

It is still another object of this invention to employ agitator and mixing elements having a simple mechanical arrangement to process high viscosity materials with greater efficiency.

More specifically, the present invention provides a means by which a reactor comprising a hollow cylindrical vessel having mounted within it one or more stage barriers which, in conjunction with the vessel wall, define the boundaries of each reaction stage within the vessel. This stage barrier uniformly restricts the flow of material within each stage of the reactor and is designed to provide a passage for uniformly controlling the egress of process materials from each stage. The vessel has inlet means for the continuous introduction of process material at one end of the stage and an outlet means for the discharge of process materials at the other. A mixing assembly is mounted within each stage for uniformly mixing and recirculating process materials in each stage at a predetermined rate. Each mixing assembly includes a central helical screw, one or more helical ribbon agitators, and a draft tube all of which are attached to a central rotor shaft. The rotor shaft extends longitudinally through the vessel along its central axis and passes through the central portion of the stage barrier. The draft tube is mounted coaxially within each stage thereby defining an annular passage between the stage wall and the tube. The draft tube controls the direction of flow of process materials within each stage and assures that the material being processed is uniformly advanced within the reactor at a fixed, preselected rate. The helical screw and the helical ribbon agitator are coaxially mounted to the rotor shaft, with the screw occupying the cylindrical passage within the draft tube. The ribbon agitator has a pitch opposite to that of the screw and occupies the annular passage between the draft tube and the reactor wall. When rotated, the helical ribbon agitator and the helical screw cooperate with the draft tube, the stage barrier and the reactor walls to establish a uniform recirculation of process materials in a fixed path within the stage. The direction of recirculation can be varied depending on the configuration of the reactor and process requirements as long as uniformity of treatment is maintained. The elements of the mixing assembly, in conjunction with the pressure created by materials being continuously introduced into the reactor, also cooperate to advance a preselected fixed portion of the process material through the passage formed by the stage barrier. The internal pressure produced by the net flow of the process material, out of each stage and the stage barrier, cooperate to prevent material from backmixing, or flowing back into the stage from which the material is exiting. This assures uniform treatment of the process material.

The reactor may have one stage or multiple stages, depending upon the degree of control required in processing the material. As the number of stages is increased, the average residence time required to complete the reaction decreases and the possibility of non-homogeneous treatment of materials is reduced.

If desired, heat exchange means may be provided to supply or extract heat in one or more of the stages, depending upon the preferred operating temperatures required for given processes and materials. Heat exchange means can be jacketed housings surrounding the reactor shall or the mixing elements may be hollowed out to provide enclosed passages for carrying a heat exchange fluid within the reactor elements. Also, temperature sensing means, such as thermocouples, may be provided in order to monitor the temperatures of the process material.

The reactor may be operated in any orientation. When operated in the horizontal position, the helical ribbon provides the additional advantage of being able to enhance the separation of vapor from the viscous process material.

These and related objectives, features and advantages of the present invention will become apparent from the following description when viewed in conjunction with the following drawings:

FIG. 1 illustrates a longitudinal cross section of a vertically oriented two-stage reactor embodying a preferred form of the present invention;

FIG. 2 is a schematic cross section which depicts the flow of materials into, out of, and within the reactor;

Figure 3:
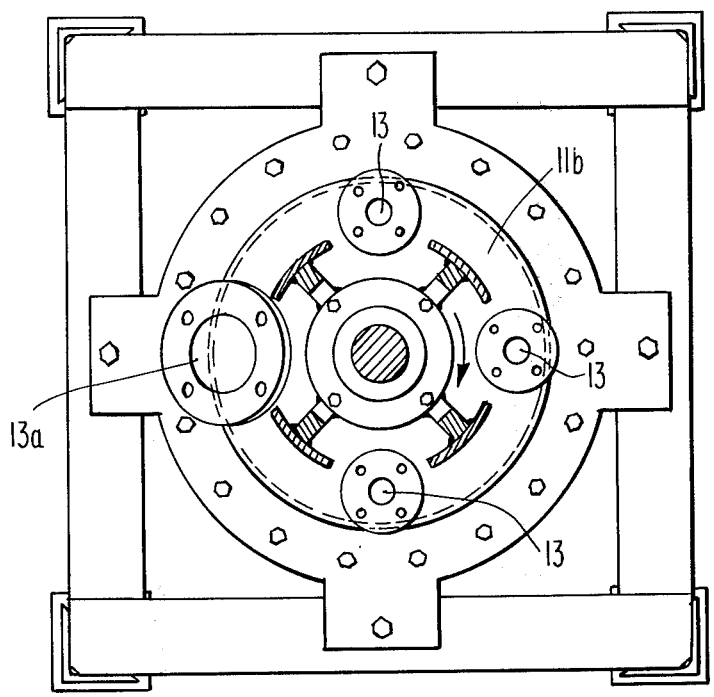
FIG. 3 is a top view of the reactor taken along line 3—3 of FIG. 1.

Referring to the drawings, there is illustrated in FIG. 1 a two-stage reactor for the continuous processing of high viscosity materials embodying the present invention. Reactors of the present invention may have more than two stages depending on process requirements. The flow path of process materials is indicated by arrows in FIG. 2 which depict the directions in which material moves through the reactor. As stated before, this direction of flow can be varied with equal success depending on the reactor configuration and process conditions so long as uniformity of flow is maintained.

As seen in FIG. 1, the reactor comprises an elongated hollow cylindrical vessel 10 having closed ends 11a and 11b with an inlet 12 for the introduction of process materials in its lower end 11a and outlets 13,13,13 for the discharge of process materials in its upper end 11b. The inlet 12 and the outlets 13,13,13 are flanged to facilitate connection to a source for the introduction of process materials under pressure and for the discharge of processed materials to a reservoir. The pressure at the inlet 12 is greater than the pressure at the outlets 13,13,13 thereby producing a net flow of process materials from the inlet upwardly to the outlet as depicted by FIG. 2. Additional ports 13a, 14 and 15 may be added to the reactor for the introducing or exhausting process materials and by-products.

The vessel depicted in FIG. 1 has two stages 20 and 21, two stage barriers 22 and 23, and two mixing assemblies 24 and 25, one within each stage. The mixing assemblies 24 and 25 both include a draft tube 26,26a, two helical ribbon agitators 27,27', 27a,2727a', helical screws 28,28a and a central rotor shaft 29. In the illustrated embodiment, the interrupted helical ribbon agitators 27,27', 27a,27a', the helical screws 28,28a and the draft tube 26,26a are mounted to the central rotor shaft 29 for rotation about the central axis of the vessel 10.

Figure 4:
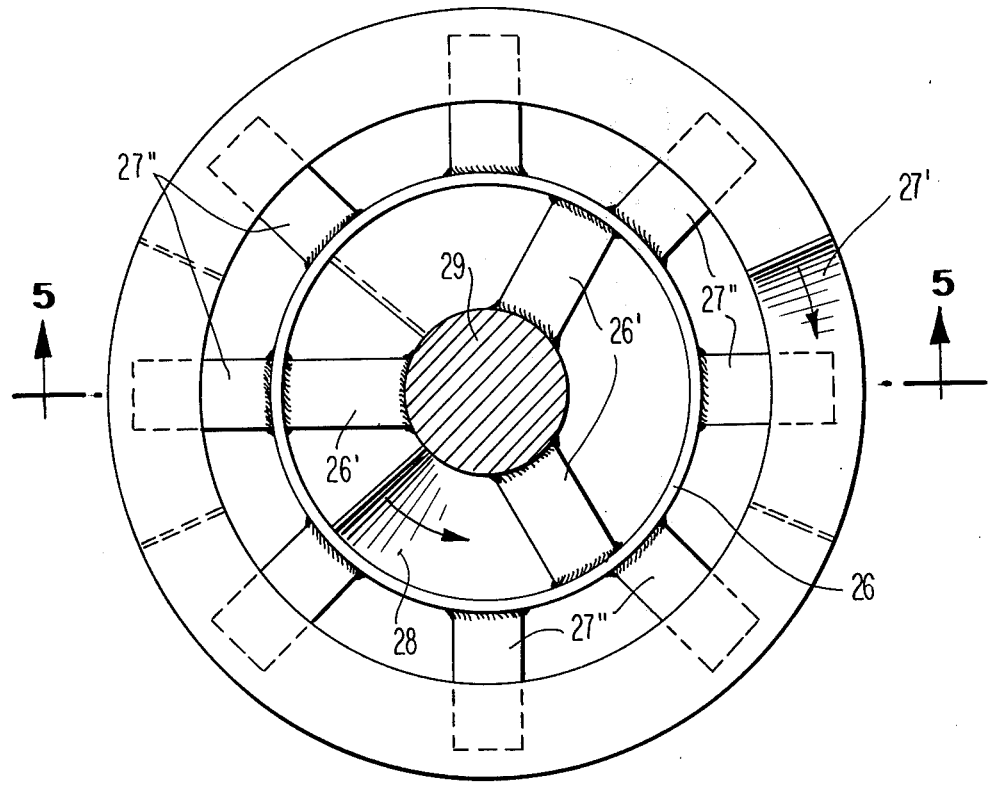
FIG. 4 is an enlarged sectional view taken along line 4—4 of FIG. 1.
Figure 5:
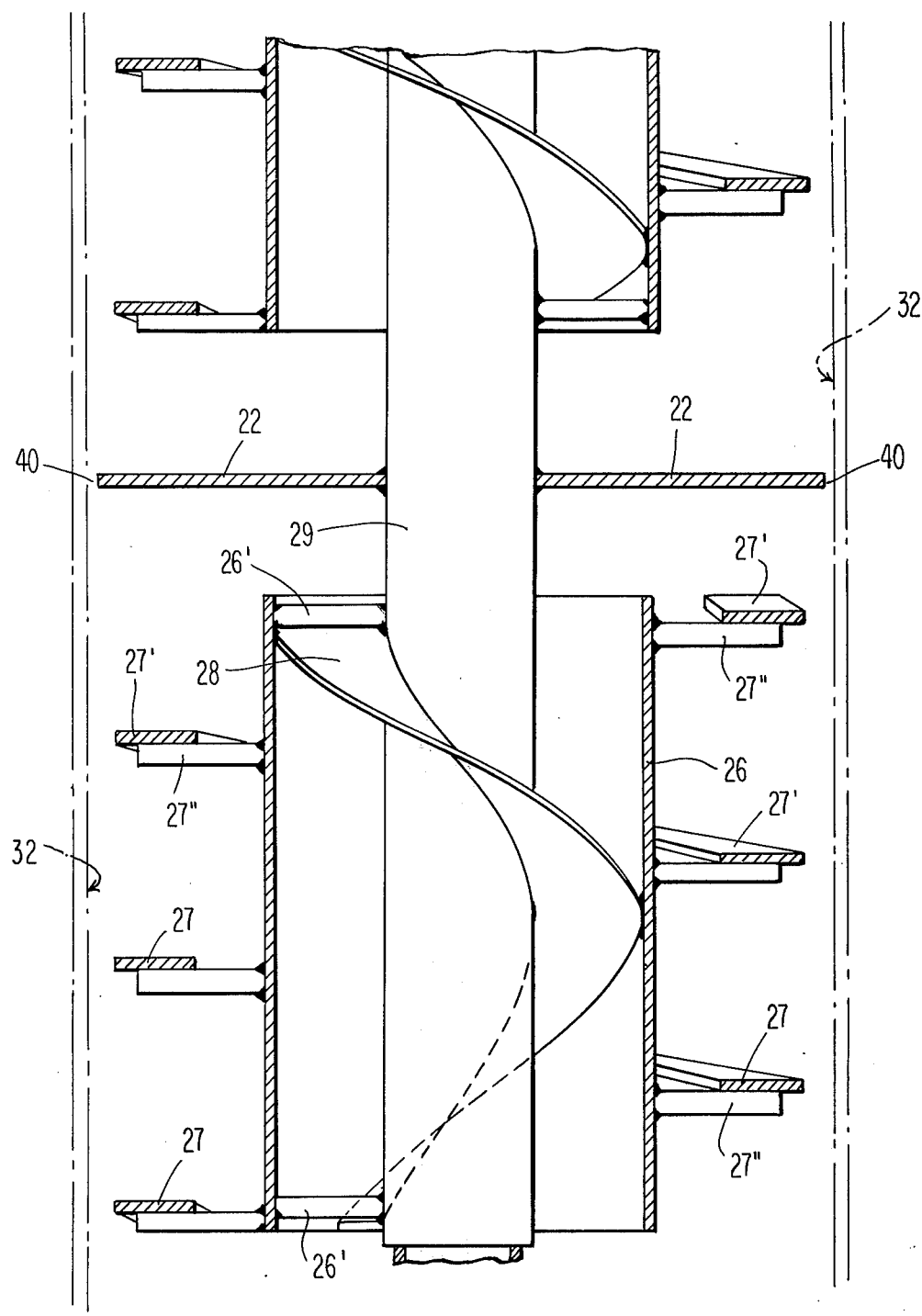
FIG. 5 is a developed view of the lower mixing assembly taken along line 5—5 of FIG. 4.

As depicted in FIG. 4, the draft tube 26 is mounted to the rotor 29 by struts 26'. Also shown in FIG. 4, the ribbon agitators 27,27' are mounted to the draft tube 26 by means of struts 27''. The screw flight 28 is also mounted to the rotor 29 and to the inner walls of the draft tube 26 by welded or like connections.

Referring to the lower stage 20 in FIG. 1, a draft tube 26 is mounted coaxially within the stage 20 of the vessel 10 and forms an annular passage 30 between the tube's exterior surface 31 and interior vessel wall 32. This annular passage communicates with the bottom 33 and top 34 openings at the ends of the draft tube 26. The helical screw 28 is mounted within the draft tube 26 and is rotated by the rotor shaft 29 about the central axis of the vessel. The helical ribbon agitators 27,27' are positioned within the annular passage 30 and are rotatably mounted to rotate with the rotor shaft 29.

In the illustrated embodiment, the process materials or reactants are introduced under pressure into the first stage 20 through the inlet 12 at one end of the reactor. Once the reactor is filled, a continuous-flow recirculating path is established by the mixing assemblies 24 and 25 in cooperation with stage walls 32,32a and stage barriers 22 and 23. Referring to the first or lower stage 20, the entering materials are continuously diverted radially outward toward the walls of the vessel 32 and are driven upward through the annular passage 30 by the ribbon agitators 27 and 27a.

As the material nears the top of the annular passage, it is substantially restricted from further upward flow by the stage barrier 22. A preselected portion of the process material will advance to the next stage 21 through the annular orifice 40 formed by the periphery of stage barrier 22 and the reactor wall 32. The remaining portion of the materials is diverted radially inward toward the center of the reactor to the entrance 34 immediately above the draft tube 26. This process material is recirculated, being moved in a downward direction by the rotating helical screw 28 mounted within the draft tube 26.

The draft tube 26 defines the average course which any portion of process material will traverse in any one stage by restricting the time of stay of such portions to an approximate predictable value. Using probability mathematics, it is possible to predict and control the residence time of a given portion of the material and how it will vary according to the change in flow rates and in other process parameters in any one stage. A more detailed account of how this calculation can be done will be found in an article by A. P. Weber entitled "Residence Time Spectrum in Continuous Flow Reactors" appearing in the Nov. 3, 1969 issue of *Chemical Engineering* magazine. The draft tubes 26,26a also serve to restrict the flow path of the material entering any stage so that it is moved radially outward in a uniform manner and there subjected to the intensive mixing of the ribbon agitators 27,27', 27a,27a' in the annular passages 30,30a.

The ratio of the portion of the material advanced out of the stage to the portion of the material recirculated within the stage can be readily controlled by adjusting the configuration of the reactor, the dimensions of the elements of the mixing assembly, the relative pitches of the helical screw and agitator, the size of passage provided by the stage barrier and the inlet pressure created by the introduction of new process materials. This ratio is selected according to the desired process conditions and specifications required by the reaction kinetics of a given chemical system. Reaction kinetics, in turn, are determined by the nature of the reactants and the stoichiometry of the chemical reaction.

Again, referring to the lower stage 20 in FIG. 1, the portion of the process materials which proceeds downwardly through the draft tube 26 exits at the bottom opening 33 of the tube. At that point, they are diverted radially outward toward the wall 32 of the vessel into the bottom of the annular passage 30. This flow is enhanced by the flow of process material entering from the inlet 12 at the base 11a of the reactor. The material at the bottom of the annular passage 30 is mixed and forced upward by the ribbon agitators 27 and 27'. In this manner, a precise recirculation flow path for the material is established within each stage.

In order to enhance the recirculation of process material, a helical screw 28 is selected which has a pitch opposite to that of the helical ribbon agitators 27 and 27'. When rotated, the screw 28 and the agitators 27 and 27' cooperate to generate complementary forces which uniformly mix and recirculate a fixed portion of process material within each stage. The primary function of the agitators is to apply mixing and shearing forces while the main function of the screw is to recirculate the material in a uniform manner at a uniform rate. In the illustrated embodiment, the first stage helical ribbon agitators 27,27' have an outside diameter which is about 95% of the vessel diameter and a blade width that is approximately 1/12th of the vessel diameter. The pitch of the ribbon agitators is about three-tenths of the vessel diameter and opposite to that of the first stage screw 28. The axial length in each stage of the interrupted ribbon agitator is approximately equal to the vessel diameter. Of course, these proportions and dimensions would vary depending upon the specific applications involved and the dimensions of the other elements in the reactor. For another reaction process, the ribbon agitator of the reactor may be a double helix having a pitch of about two-thirds the vessel diameter and a length one-and-a-half times the vessel diameter. It is also possible to operate the reactor with ribbon agitators having other configurations in the annular passage.

Referring to the preferred configuration of FIG. 1, a helical screw 28 is positioned coaxially within the draft tube 26. The screw 28 is fixably attached to the rotor shaft 29 and the inner wall draft tube. The pitch of the helical screw 28 is approximately two-thirds of the vessel diameter and is opposite to that of the ribbon agitators 27,27' and the diameter of the screw is approximately one-half the vessel diameter. The length of the screw 28 is approximately equal to the length of the draft tube 26. Double-helix screws and other screw configurations may also be employed in a reactor in accordance with the invention.

The pitch of the screw 28 relative to the pitch of the ribbon agitators 27,27' should be selected so that the ribbon would provide a considerably higher theoretical displacement rate thereby causing material to back down within the annular passage 30, as well as moving up. This provides a high rate of shear and intensive mixing within the annular passage necessary for efficient chemical reaction and heat transfer.

Also illustrated in preferred form in FIG. 1, the lower stage barrier 22 consists of a flat annular disc transversely mounted to the rotor shaft 29 and defining a coaxial annular passage 40 between the stage barrier and reactor wall 32. The rotor shaft 29 extends through the stage divider and longitudinally through the entire length of the vessel 10. It is noted that the annular passage provided by the barrier 22 in conjunction with the vessel walls 32 possesses perfect symmetry about the central longitudinal axis of the vessel. Depending upon the reaction process, this passage may take other forms, preferably symmetrical about the axis of the draft tube.

The method by which the various elements of the mixing assembly are mounted to the rotor is a matter of mechanical convenience and functional necessity. Other means of mounting these elements are also possible without departing from the spirit of the invention. Additional passages may be provided in the stage barrier depending upon the rate and direction of flow desired. Also, the stage barrier can assume other shapes or configurations as long as its primary function of restricting and controlling the flow of process materials within each stage is preserved. In a single stage reactor, the end wall adjacent to the outlet of the vessel may be designed to perform the function of the stage barrier.

Depending on the nature of the reaction taking place in the reactor, it may be desirable to supply heat or remove heat from the process materials as they advance from stage to stage within the vessel. There are a number of ways to provide heat exchange means for this purpose. In one case, the agitator components, i.e., the rotor 29, the screws 28,28a and the ribbon agitator 27,27'327a,27a' may be provided with hollow passages thereby allowing a heat transfer fluid to be flowed through the rotor shaft. In cases where additional heat transfer is required, a hollow jacket surrounding the draft tubes 26,26a or a jacketed heat source 50 surrounding the vessel wall 32 may be provided. Temperature may also be controlled by injecting steam or gas or additional heated reagents, if desired. Using any of these suggested devices, alone or in combination, heat may be either supplied or removed from the reacting materials depending upon whether the reactions are endothermic or exothermic, respectively, and the desired temperature to be maintained in the reactor.

Suitable temperature sensing means may be provided, such as thermocouples 51,51 in order to monitor the temperatures of the reactants within each stage.

In view of the foregoing, it should be apparent that with the reactor of the present invention, the completeness of various reactions may be predicted with reasonable accuracy because the residence time of the process materials in the reactor is readily predicted and controlled. When the reactor is associated with modern on-line composition and analyzers and computers, the processing of viscous reactants and products on a continuing basis under careful control is greatly improved.

While a preferred embodiment of the present invention has been described in detail, various modifications, alterations and changes may be made without departing from the spirit and scope of the present invention as defined in the appended claims.

I claim:
1. A reactor for continuous processing of high viscosity materials comprising:
   an elongated hollow vessel having a longitudinal axis, longitudinal side wall means, transverse end wall means, an inlet at one end, an outlet at the opposite end for the introduction and discharge of the process material under pressure, and a rotary drive shaft extending through said vessel along said longitudinal axis;
   a plurality of flat imperforate transverse barrier plates within said vessel and forming, in conjunction with the vessel wall means, at least two reaction stages, the first stage disposed adjacent said inlet and a second stage adjacent the outlet, one of said barrier plates having clearance between its outer periphery and the longitudinal vessel side wall to constitute an end orifice providing a restricted passage for uniform egression of a first portion of the material from the first stage in a direction away from said inlet and into said second stage at a predetermined fixed rate, another of said barrier plates having clearance between its outer periphery and the longitudinal vessel side wall to constitute an end orifice providing a restricted passage adjacent to said outlet for the uniform egression of a predetermined portion of the process material from the second stage in a direction away from said inlet and towards said outlet;
   mixing means mounted within each reaction stage on said elongated drive shaft, said shaft driving said mixing means at a given speed for homogeneously agitating and recirculating a second portion of the process material which remains in each stage after egression of said first portion from said stage, said mixing means comprising:

a longitudinal draft tube mounted concentrically on said shaft, said draft tube being spaced from the wall means forming said stage and defining a continuous recirculating flow path for process material within the stage, said path including an advancing annular passage between said tube and the longitudinal side wall means of the vessel and a return annular passage within said tube;

a helical screw having a pitch in one direction with its axis longitudinal mounted concentrically on said drive shaft and extending between the drive shaft and the draft tube; and helical agitator means having a pitch opposite to that of the helical screw mounted with its axis longitudinal and mounted concentrically on said drive shaft in the space between the draft tube and vessel longitudinal side wall means, whereby in each stage upon driving said drive shaft, said agitator advances the first and second portions of the process material in said advancing passage of said path exteriorly of the tube and said helical screw returns said second portion of the process material in said return passage of said path interiorly of the tube, the width of said shaft tube, the pitch of said helical screw, the speed of said drive shaft, the size of the orifice and the viscosity and pressure of the material introduced through said inlet cooperating to control the flow in said path and determine the ratio between said first and second portions of said material and thereby the residence time of the material in each stage of said reactor.

2. A reactor according to claim 1 wherein said draft tube, screw, blade means, and barrier plate in each stage are welded to said shaft for rotation with said shaft.

3. A reactor according to claim 1 wherein said vessel is vertically mounted and the process material is advanced in a downward direction inwardly of said draft tube and in an upward direction exteriorly of said draft tube.

4. A reactor according to claim 1 including heat transfer means around said vessel wall means for transferring heat to or from said process material.

* * * * *

UNITED STATES PATENT OFFICE
CERTIFICATE OF CORRECTION

Patent No. 4,007,016  Dated February 8, 1977

Inventor(s) Arthur P. Weber

It is certified that error appears in the above-identified patent and that said Letters Patent are hereby corrected as shown below:

Column 5, line 33, "27,27', 27a,2727a' " should be --27,27', 27a,27a'--;

Column 8, line 2, "27,27'327a,27a' " should be

--27,27', 27a,27a'--;

*Signed and Sealed this*

Sixteenth Day of May 1978

[SEAL]

Attest:

RUTH C. MASON  LUTRELLE F. PARKER
*Attesting Officer*  *Acting Commissioner of Patents and Trademarks*